May 22, 1951 A. A. GRIFFITH 2,554,187
FLUID-SOLID BOUNDARY SURFACE FOR AIRCRAFT
Filed Aug. 12, 1946 2 Sheets-Sheet 1
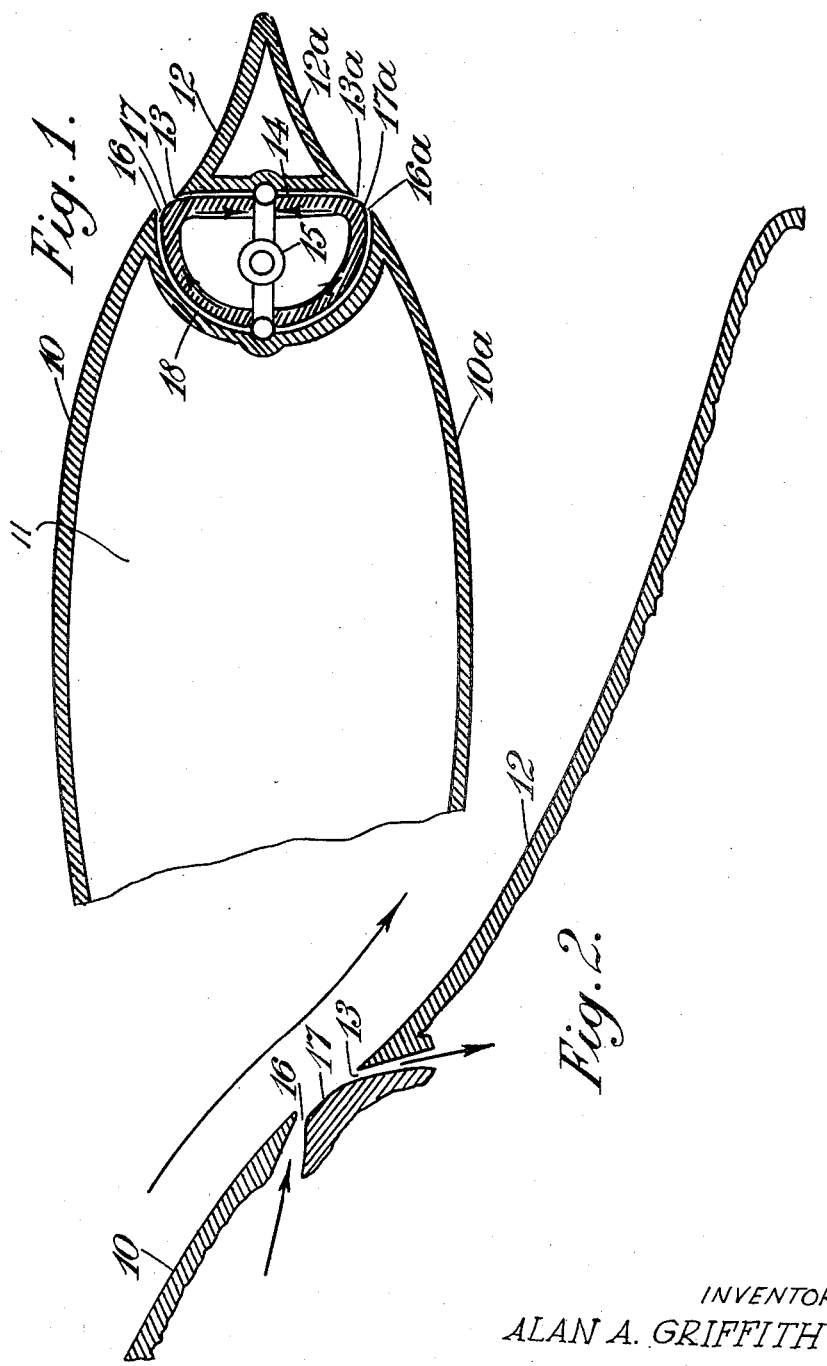
INVENTOR
ALAN A. GRIFFITH
BY Wilkinson & Mawhinney
ATTORNEYS May 22, 1951 A. A. GRIFFITH 2,554,187
FLUID-SOLID BOUNDARY SURFACE FOR AIRCRAFT
Filed Aug. 12, 1946 2 Sheets-Sheet 2

INVENTOR
ALAN A. GRIFFITH
BY Wilkinson + Mawhinney
ATTORNEYS

Patented May 22, 1951

2,554,187

UNITED STATES PATENT OFFICE 2,554,187

FLUID-SOLID BOUNDARY SURFACE FOR AIRCRAFT

Alan Arnold Griffith, Derby, England, assignor to Rolls-Royce, Limited, Derby, England, a British company Application August 12, 1946, Serial No. 689,916
In Great Britain August 20, 1945

5 Claims. (Cl. 244—42)

This invention relates to fluid-solid boundary surfaces where the fluid flows relatively to the solid over the surface of the solid and the fluid pressure on the surface of the solid increases in the general direction of the flow of the fluid over the surface and where a slot is provided in the surface of the solid through which the fluid boundary layer may be sucked away to prevent too rapid a rise of fluid pressure on the surface and thus to minimise any tendency for the fluid flow to break away from the surface with consequential losses. There exists on the surface of the solid a stagnation point a short distance down-stream of the suction slot at which point the fluid further from the surface, just beyond the layer that is sucked away is brought to rest on the surface, thereby generating the corresponding dynamic pressure. In general, therefore, there is a sharp rise of pressure from the slot to the stagnation point followed by a sharp but smaller fall in pressure and then a more gradual rise in pressure; in the area where the gradual rise in pressure occurs the tendency for the fluid flow to break away from the solid surface still exists.

In United States Patent No. 2,408,632 there is claimed a solid having a surface over which fluid flows, which is provided with at least one suction slot and which surface is convex to the fluid upstream of the slot and is concave to the fluid downstream of the slot with the greatest arithmetical curvature at the slot in each case, and means for sucking some of the fluid through the slot.

By "arithmetical curvature" is meant the value of the reciprocal of the radius of curvature without paying any attention to the sign of such reciprocal.

It is found, that, with a fluid-solid boundary surface as described and claimed in the prior specification, the amount of fluid that must be sucked away through each suction slot is inconveniently large in certain circumstances. For example, if a suction slot is provided near the trailing edge of the upper surface of an aircraft wing which surface is convex forwardly, or upstream, of the slot and concave aft, or downstream, of the slot, it is found that the boundary layer over the surface is laminar forward of the slot over the range of angles of incidence occurring in normal cruising flight. The slot and an associated suction pump can be designed to remove this laminar boundary layer. When, however, such a wing is set at a large angle of incidence as is necessary for take off and in some climbing conditions, the boundary layer over the upper surface of the wing becomes thick and turbulent. The quantity of air that must then be removed through the slot to prevent separation of the main flow from the wing surface is then greater than can conveniently be dealt with by the slot and pump designed to remove the much thinner laminar layer.

According to the present invention, a fluid-solid boundary surface is provided with a further slot a short distance upstream of the suction slot and directed downstream, through which further slot fluid is blown along the surface towards the suction slot. The width of the additional slot should be approximately equal to or greater than that of the suction slot and its distance from the suction slot should be in the order of ten times its own width. The pressure of the fluid supply to the additional slot should be approximately equal to or greater than that of the main fluid flow outside the boundary layer. When the invention is applied to an aircraft wing, the supply to the additional slot may be obtained by means of a forwardly facing air-intake connected to the slot by a suitable conduit.

A construction in accordance with this invention will now be described, by way of example only, with reference to the accompanying drawings in which:

Figure 1 is a diagrammatic section through an aircraft wing incorporating slots in accordance with the invention and shows diagrammatically one means for energising the slots;

Figure 2 is an enlarged view of part of Figure 1, and

Figure 3:
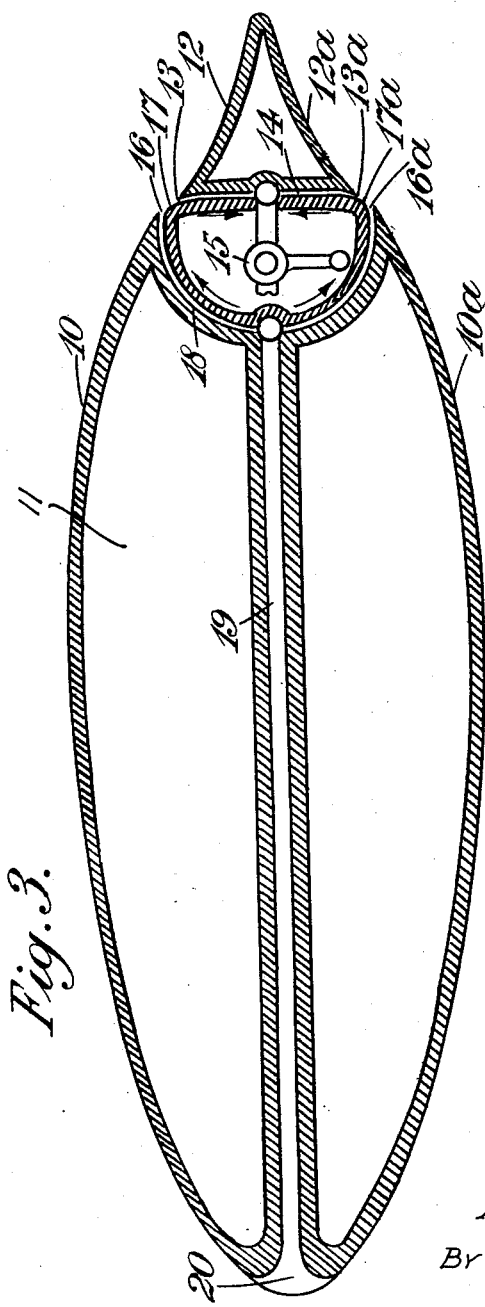
Figure 3 is a diagram similar to Figure 1, but showing an alternative means for energising the slots.

As shown in Figure 1, the upper and lower surfaces 10 and 10a of the wing 11 are generally convex but become concave at 12 and 12a, towards the trailing edge of the wing.

As best shown in Figure 2, a suction slot 13 is provided along the upstream side of the concave surface 12 to make an acute angle therewith and to face upstream. This slot 13 is connected through suitable conduits 14 (Figure 1) to the intake of a pump 15 which is driven in any suitable manner so that it sucks the boundary layer on the surface 10, through the slot 13. An additional slot 16 is provided along the downstream side of the convex surface 10 of the wing and faces downstream. The slot 16 makes an acute angle with the convex surface 10. The wall forming the downstream side of the slot 16 merges by means of a smooth curved surface 17 with the wall forming the upstream side of the suction slot 13 and the surface 17 forms part of the convex portion of the wing surface so that the transition from convex to concave curvature is at the suction slot 13.

The arithmetical curvature of the convex portion 10, 17 of the wing gradually increases from left to right and reaches a maximum at the slot 13. The arithmetical curvature of the concave portion 12 is a maximum at the slot 13 and gradually decreases from left to right. Stated another way, the radii of curvature of the surface 10, 17, and the surface 12 are both shortest at the slot 13, and increase in length gradually as one progresses along the respective surfaces away from the slot.

As shown in Figure 1, the slot 16 is connected by conduits 18 to the delivery of the pump 15 which supplies air to the slot 16 at a suitably increased pressure.

A suction slot 13a and an additional slot 16a are provided and the lower wing surface, which is made up of the convex wing surface 10a, 17a and the concave wing surface 12a, and are connected to the pump 15 in the same way.

Instead of connecting the slots 16 and 16a to the pump 15, they may be connected by a suitable conduit 19 to a forwardly directed air intake 20 as shown in Figure 3. By means of the present improvement, the quantity of air or other fluid that must be withdrawn through the suction slot is no greater with a thick boundary layer than with a laminar boundary layer.

I claim:

1. A body providing a fluid-solid boundary surface along which fluid flows in one direction relatively to the solid, comprising a convex portion on said surface, a concave portion on said surface downstream of said convex portion, and having a junction therewith, each of said portions having its greatest arithmetical curvature at said junction, an induction slot in the said surface situated at said junction of said convex and concave portions and facing upstream, an eduction slot situated in the convex portion of said surface and facing downstream, means withdrawing air from said surface into said induction slot, and means delivering air out on to said surface from said eduction slot.

2. A body providing a fluid-solid boundary surface along which fluid flows in one direction relatively to the solid, comprising a convex portion on said surface, a concave portion on said surface downstream of said convex portion and having a junction therewith, each of said portions having its greatest arithmetical curvature at said junction, an induction slot in the said surface situated at said junction of said convex and concave portions and facing upstream, an eduction slot situated in the convex portion of said surface and facing downstream, at least equal in width to said induction slot, means withdrawing air from said surface into said induction slot, and means delivering air out on to said surface from said eduction slot.

3. A body providing a fluid-solid boundary surface along which fluid flows in one direction relatively to the solid, comprising a convex portion on said surface, a concave portion on said surface downstream of said convex portion and having a junction therewith, each of said portions having its greatest arithmetical curvature at said junction, an induction slot in the said surface situated at said junction of said convex and concave portions and facing upstream, an eduction slot situated in the convex portion of said surface and facing downstream at a point about ten times its own width from said induction slot, means withdrawing air from said surface into said induction slot, and means delivering air out on to said surface from said eduction slot.

4. A body providing a fluid-solid boundary surface along which fluid flows in one direction relatively to the solid, comprising on the upper surface of the body a convex portion on said upper surface, a concave portion on said upper surface downstream of said convex portion and having a junction therewith, each of said portions having its greatest arithmetical curvature at said junction, an induction slot in the upper surface of the body situated at said junction of said convex and concave portions and facing upstream, an eduction slot situated in the convex portion of said surface and facing downstream, a conduit opening to the leading edge of the body and extending to said eduction slot, and a suction pump withdrawing air from said surface into said induction slot.

5. A wing for aircraft providing a fluid-solid boundary surface along which fluid flows in one direction relatively to the solid, comprising a convex portion, a concave portion downstream of said convex portion and having a junction therewith, each of said portions having its greatest arithmetical curvature at said junction, an induction slot in the said surface situated at the junction of said convex and concave portions and facing upstream, an eduction slot at least equal in width to said suction slot situated in the convex portion on said surface at a point about ten times its own width from said induction slot and facing downstream, means withdrawing air from said surface into said induction slot and means delivering air out on to said surface from said eduction slot.

ALAN ARNOLD GRIFFITH.

REFERENCES CITED

The following references are of record in the file of this patent:

UNITED STATES PATENTS

| Number | Name | Date |
|---|---|---|
| 1,913,644 | Stalker | June 13, 1933 |
| 2,267,927 | Knightlinger | Dec. 30, 1941 |
| 2,392,419 | Stalker | Jan. 8, 1946 |
| 2,406,506 | Northrop | Aug. 27, 1946 |
| 2,406,916 | Stalker | Sept. 3, 1946 |
| 2,406,920 | Stalker | Sept. 3, 1946 |
| 2,407,185 | Stalker | Sept. 3, 1946 |
| 2,427,972 | Melchior | Sept. 23, 1947 |
| 2,463,864 | Gibson | Mar. 8, 1949 |

FOREIGN PATENTS

| Number | Country | Date |
|---|---|---|
| 29,364 | Great Britain | of 1911 |
| 439,805 | Great Britain | Dec. 6, 1935 |
| 512,064 | Great Britain | Aug. 29, 1939 |